(12) United States Patent
Wang et al.

(10) Patent No.: US 9,763,234 B2
(45) Date of Patent: Sep. 12, 2017

(54) METHOD AND APPARATUS FOR UPLINK RESOURCE ALLOCATION

(71) Applicant: Telefonaktiebolaget L M Ericsson (publ), Stockholm (SE)

(72) Inventors: Jun Wang, Nanjing (CN); Yingde Liu, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 14/763,234

(22) PCT Filed: Jan. 28, 2013

(86) PCT No.: PCT/CN2013/071046
§ 371 (c)(1),
(2) Date: Jul. 24, 2015

(87) PCT Pub. No.: WO2014/114001
PCT Pub. Date: Jul. 31, 2014

(65) Prior Publication Data
US 2015/0373693 A1  Dec. 24, 2015

(51) Int. Cl.
*H04W 72/04* (2009.01)
*H04W 74/08* (2009.01)
*H04W 74/00* (2009.01)

(52) U.S. Cl.
CPC ... *H04W 72/0413* (2013.01); *H04W 72/0406* (2013.01); *H04W 74/0833* (2013.01); *H04W 74/002* (2013.01)

(58) Field of Classification Search
USPC .......................................... 370/329; 455/450
See application file for complete search history.

(56) References Cited

U.S. PATENT DOCUMENTS

| | | | |
|---|---|---|---|
| 8,824,968 B2 * | 9/2014 | Kim | ...................... H04L 5/0091 370/329 |
| 9,307,414 B2 * | 4/2016 | Smadi | |
| | | (Continued) | |

FOREIGN PATENT DOCUMENTS

| | | |
|---|---|---|
| CN | 101340725 A | 1/2009 |
| CN | 101677446 A | 3/2010 |

OTHER PUBLICATIONS

PCT Notification of Transmittal of the International Search Report and the Written Opinion of the International Searching Authority, or the Declaration for International application No. PCT/CN2013/071046, Oct. 31, 2013.

(Continued)

*Primary Examiner* — Edan Orgad
*Assistant Examiner* — Emmanuel Maglo
(74) *Attorney, Agent, or Firm* — Baker Botts, LLP

(57) ABSTRACT

Methods and apparatuses for uplink resource allocation have been disclosed. The method comprises: determining a frequency position of physical random access channel (PRACH) in a frequency region for physical uplink control channel (PUCCH); and determining a frequency position of the PUCCH based on a logic-to-physical mapping rule. The logic-to-physical mapping rule takes the frequency position of the PRACH as a parameter. According to the proposed solution, the PUSCH resource can be kept continuous and the flexibility of PRACH configuration can be maintained.

17 Claims, 4 Drawing Sheets

(56) References Cited

U.S. PATENT DOCUMENTS

| | | | |
|---|---|---|---|
| 2009/0203384 A1* | 8/2009 | Vujcic | H04W 74/08 455/450 |
| 2012/0184206 A1* | 7/2012 | Kim | H04L 5/0091 455/9 |
| 2013/0022019 A1* | 1/2013 | Han | H04L 5/0053 370/329 |
| 2013/0136073 A1* | 5/2013 | Kato | H04L 5/0007 370/329 |
| 2013/0215848 A1* | 8/2013 | Kato | H04W 74/0833 370/329 |
| 2013/0295989 A1* | 11/2013 | Smadi | H04W 72/1215 455/553.1 |
| 2014/0050181 A1* | 2/2014 | Tiirola | H04L 5/0035 370/329 |
| 2015/0092660 A1* | 4/2015 | Shperling | H04B 7/15507 370/315 |
| 2015/0282102 A1* | 10/2015 | Kakishima | H04W 52/40 370/329 |

OTHER PUBLICATIONS

3GPP TS 36.211 V8.6.0; Technical Specification; 3rd Generation Partnership Project; Technical Specification Group Radio Access Network; Evolved Universal Terrestrial Radio Access (E-UTRA); Physical Channels and Modulation (Release 8), Mar. 2009.

* cited by examiner

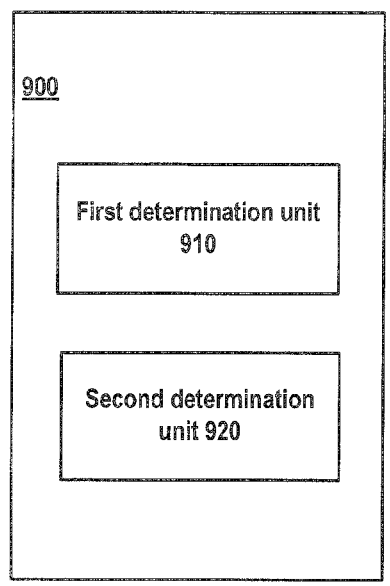
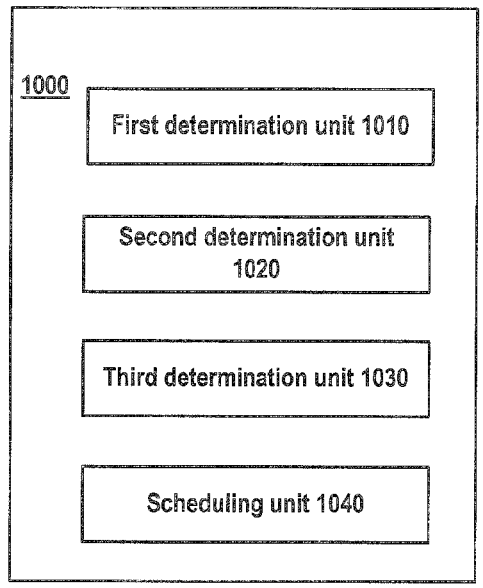
FIG. 9
FIG. 10
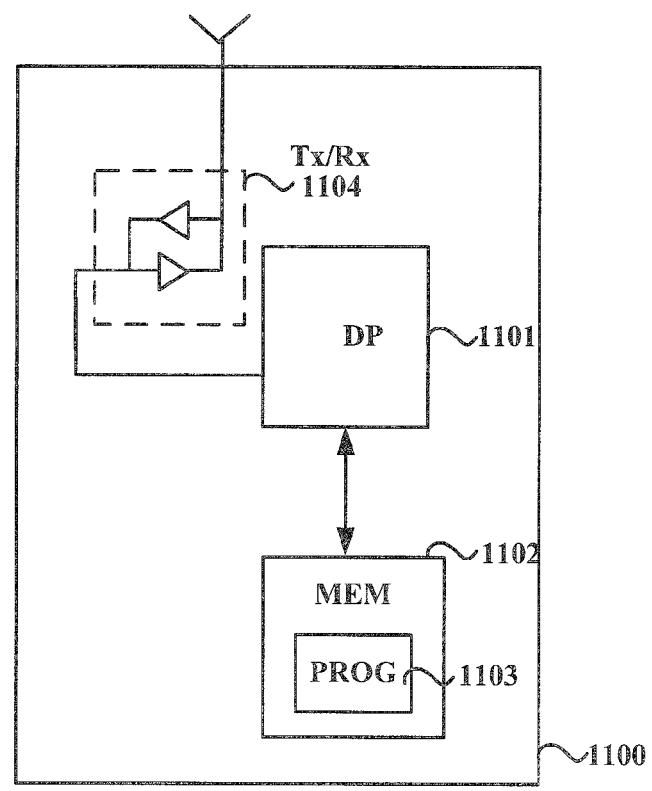
FIG. 11

METHOD AND APPARATUS FOR UPLINK RESOURCE ALLOCATION

PRIORITY

This nonprovisional application is a U.S. National Stage Filing under 35 U.S.C. §371 of International Patent Application Serial No. PCT/CN2013/071046, filed Jan. 28, 2013, and entitled "METHOD AND APPARATUS FOR UPLINK RESOURCE ALLOCATION."

TECHNICAL FIELD

Embodiments of the present invention generally relate to communication systems, and more particularly to a method, an apparatus, a user equipment, a base station, and a computer readable storage media for uplink resource allocation.

BACKGROUND

This section introduces aspects that may facilitate a better understanding of the invention(s). Accordingly, the statements of this section are to be read in this light and are not to be understood as admissions about what is in the prior art or what is not in the prior art.

In Long-Term Evolution (LTE), there are various physical channels. An uplink physical channel corresponds to a set of resource elements carrying information originating from higher layers. The following uplink physical channels are defined: Physical Uplink Shared Channel (PUSCH); Physical Uplink Control Channel (PUCCH); and Physical Random Access Channel (PRACH).

Physical random access channel (PRACH) in uplink is a very important physical channel. All user equipments (UEs) start random access into a cell only by PRACH, using different format and resource configured by the cell. Only after successful access, the UE can establish the radio bearer (RB) and transmit user data in uplink and receive data in downlink.

In Reference 1, 3GPP TS 36.211 v8.6.0, "$3^{rd}$ Generation Partnership Project; Technical Specification Group Radio Access Network; Evolved Universal Terrestrial Radio Access (E-UTRA); Physical Channels and Modulation", time and frequency structure of PRACH has been described. The physical layer random access preamble consists of a cyclic prefix of length $T_{CP}$ and a sequence part of length $T_{SEQ}$. According to the LTE standard, there are five types of PRACH format. Each type occupies 6 resource blocks (RBs) in frequency. During a same period of time, there maybe have several PRACH resources with a same format. They occupy different positions in frequency.

For example, FIG. 1 illustrates an example of resource allocation wherein two PRACH resources with the same format 0 exist in a same sub-frame.

FIG. 1 shows the operating bandwidth and one sub-frame consisted of two time slots. The PUCCH resources typically consist of number of resource blocks, at edge of the operating bandwidth. The PUCCH supports multiple formats: format 1, format 1a, format 1b, format 2, format 2a, and format 2b. In the below, the multiple formats are abbreviated as PUCCH1/1a/1b, PUCCH2/2a/2b, respectively. The middle part is PUSCH resources. Two PRACH resources are located within the PUSCH resources.

As seen from FIG. 1, the PUSCH resources are divided into three separate islands by the two PRACH resources and cannot be completely used due to Single Carrier rule in LTE uplink. In LTE, Single Carrier rule requires that the PUSCH resource allocated for a UE must be continuous on frequency in one slot.

A discontinuous PUSCH resource will result in low resource usage efficiency in all cases. For example, FIG. 2 shows the PUSCH allocation for one UE in the single UE case. The allocation of PUCCH and PRACH is similar with that shown in FIG. 1. The middle segment (part 2) of the PUSCH resources is allocated for the single UE 1. The upper segment (part 1) and the lower segment (part 3) of the PUSCH resources cannot be allocated to UE 1 to use. It can be seen that the single UE cannot fully utilize all the PUSCH resource, causing the uplink throughput unable to reach the peak rate.

In the multiple UEs case, if one UE need more frequency resource (i.e., resource blocks) than the PUSCH fragment (e.g., part 1 and part 3 as shown in FIG. 1) to transmit the uplink data, then it has to allocate resource from a larger PUSCH segment (e.g., part 2 as shown in FIG. 1) and leave those PUSCH frequency resources (i.e., RBs) between the PUCCH and the PRACH unused even if they are free to use. On the other hand, if one UE need fewer RBs than the PUSCH fragment, although the fragment can be used to allocate resources for that UE, it still will leave a smaller fragment unused after consuming some part of the fragment.

3GPP standard also provides the flexibility of configuring PRACH at different position within the frequency spectrum. In this regard, it is possible to move PRACH form PUSCH into PUCCH area to achieve continuous PUSCH resource block. Unfortunately, it may still meet trouble in odd number PRACH case as illustrated in FIG. 3.

FIG. 3 shows the PRB "hole" in the PUCCH area when the PRACH number is odd. As shown in FIG. 3, existing PUCCH layout is a symmetric structure to support frequency hopping, so PRACH also must reserve two symmetric parts located at two ends of the frequency spectrum. The $SR_1$ and $SR_2$ in FIG. 3 are the parts for PUCCH format 1. However, if the PRACH number is odd, how to utilize the other one (?? part shown in FIG. 3)? Due that the PRACH cannot support frequency hopping, that idle part cannot be used by PUCCH. Otherwise, the second slot of PUCCH will conflict with PRACH. The only feasible usage is for PUSCH. However, it will still result in the discontinuous PUSCH resource like shown in FIGS. 1-2.

SUMMARY

Therefore, it would be desirable in the art to provide a new solution for uplink resource allocation. It would also be desirable to provide an uplink resource allocation mechanism which guarantees continuous PUSCH resource and flexibility of the PRACH configuration. It would further be desirable to provide a resource allocation mechanism supporting PUCCH frequency hopping, while keeping PUSCH resource continuous.

To better address one or more of the above concerns, in a first aspect of the invention, a method for uplink resource allocation is provided. The method comprises: determining a frequency position of physical random access channel (PRACH) in a frequency region for physical uplink control channel (PUCCH); and determining a frequency position of the PUCCH based on a logic-to-physical mapping rule. The logic-to-physical mapping rule takes the frequency position of the PRACH as a parameter.

In some embodiments, a logic space of the PUCCH and a logic space of the PRACH are independent of each other, which enables configuration of the PUCCH and configuration of the PRACH to be independent of each other.

In some embodiments, the logic-to-physical mapping rule determines the frequency of the PUCCH further based on a parity of the number of the PRACH in a current sub-frame.

In some embodiments, according to the logic-to-physical mapping rule, when an initial physical resource block (PRB) position of the PUCCH without consideration of the PRACH is located at an inner side of the PRACH, the initial PRB position of the PUCCH is shifted inward the PRB number of the PRACH, and the inner side means the direction towards the middle of an operating bandwidth.

In some embodiments, when the method is performed at the network side, the method further comprises: determining a user equipment which does not support the method for uplink resource allocation; and scheduling the user equipment at a resource rather than a specific downlink sub-frame. Corresponding hybrid automatic retransmission request (HARQ) feedback of the specific downlink sub-frame will be impacted by a subsequent PRACH.

In some embodiments, the specific downlink sub-frame can be identified based on both of the following conditions: an HARQ feedback of the specific downlink sub-frame will appear at the same uplink sub-frame as the subsequent PRACH; and an HARQ feedback of the specific downlink sub-frame will be located at an HARQ PRB at an inner side of the subsequent PRACH.

In a second aspect of the invention, an apparatus for uplink resource allocation is provided. The apparatus comprises: a first determination unit, configured for determining a frequency position of physical random access channel (PRACH) in a frequency region for physical uplink control channel (PUCCH); and a second determination unit, configured for determining a frequency position of the PUCCH based on a logic-to-physical mapping rule. The logic-to-physical mapping rule takes the frequency position of the PRACH as a parameter.

In a third aspect of the invention, a user equipment is provided. The user equipment comprises the apparatus according some embodiments of the second aspect of the invention.

In a fourth aspect of the invention, a base station is provided. The base station comprises the apparatus according to some embodiments of the second aspect of the invention.

In a fifth aspect of the invention, a computer-readable storage media having computer program code stored thereon is provided. The computer program code is configured to, when executed, cause an apparatus to perform actions in the method according to the first aspect of the invention.

Particular embodiments of the subject matter described in this specification can be implemented so as to realize one or more of the following advantages.

With particular embodiments of the techniques described in this specification, the PUSCH resource can be kept continuous by locating PRACH in the frequency region for PUCCH. Through redesigning a PRACH-aware logic-to-physical mapping rule, the flexibility of PRACH configuration is achieved. Further, the configuration of the PUCCH may be simplified by making the logic space of the PUCCH and the logic space of the PRACH independent of each other. In some embodiment, the logic-to-physical mapping rule further considers the parity of the number of the PRACH, such that the frequency spectrum will not leave a PRB "hole" due to support of the frequency hopping of PUCCH when the PRACH number is odd.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which:

FIG. 9 is a schematic block diagram of an apparatus 900 that may be configured to practice exemplary embodiments according to some embodiments of the present invention;

FIG. 10 is a schematic block diagram of an apparatus 1000 that may be configured to practice exemplary embodiments according to some further embodiments of the present invention; and FIG. 11 illustrates a simplified block diagram of an entity 1100 that is suitable for use in practicing exemplary embodiments of the present invention.

Like reference numbers and designations in the various drawings indicate like elements.

DETAILED DESCRIPTION

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification.

While it is described below in the context of a LTE type cellular network for illustrative purposes and since it happens to be well suited to that context, those skilled in the art will recognize that the invention disclosed herein can also be applied to various other types of cellular networks.

In order to keep the PUSCH resource continuous, the PRACH will be located in the frequency region for PUCCH. To keep the flexibility of PRACH within the spectrum, the PRACH is allowed to move freely within the whole PUCCH area. Thus, when mapping the PUCCH from its logic space to the common physical space, a PRACH-aware logic-to-physical mapping rule is redesigned to consider the frequency position of the PRACH. In this way, the PUCCH information distributed among discontinuous physical resource block (PRB) can however be recognized in a continuous logic space.

Figure 1:
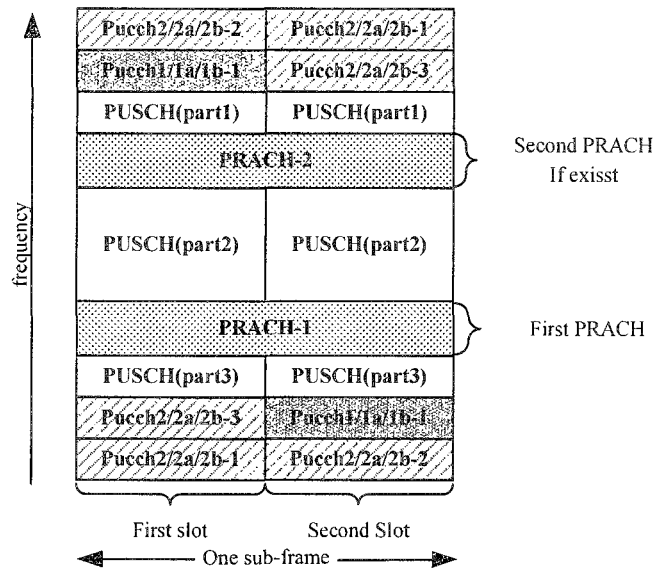
FIG. 1 illustrates an example of resource allocation where two PRACH resources with the same format 0 exist in a same sub-frame.
Figure 2:
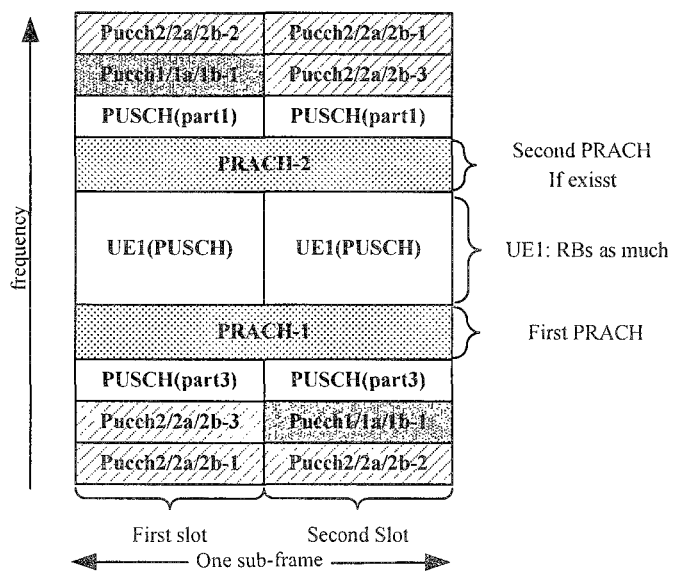
FIG. 2 shows the PUSCH allocation for one UE in the single UE case.
Figure 3:
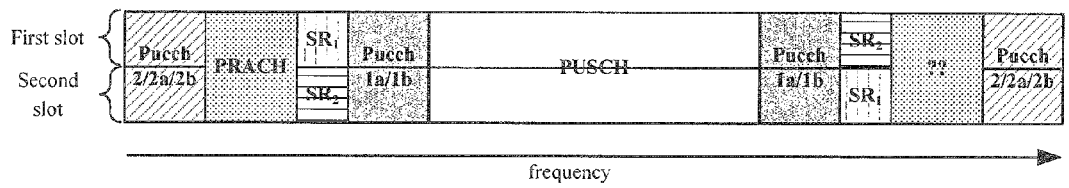
FIG. 3 shows the PRB "hole" in the PUCCH area when the PRACH number is odd.
Figure 4:
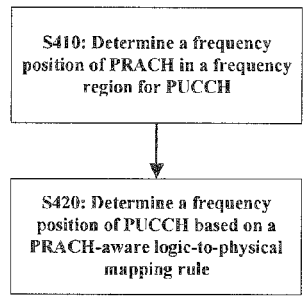
FIG. 4 shows a general process flow of the method for uplink resource allocation according to embodiments of the present invention.

FIG. 4 shows a general process flow of the method for uplink resource allocation according to embodiments of the present invention. The skilled in the art can understand that, the method may be performed at the network side (e.g., in a base station) or the user side (e.g., in a user equipment).

The method starts at the step S410 where a frequency position of PRACH is determined in a frequency region for PUCCH.

As mentioned previously, an aim of the present invention is to keep the PUSCH resource continuous. Because the amount of the resources allocated to PUCCH1/1a/1b in every sub-frame depends on actual downlink scheduling, it is varied and cannot be forecasted. Due to the varied PUCCH1/1a/1b (for HARQ feedback), the boundary of PUCCH1/1a/1b with the PUSCH also fluctuates per transmission time interval (TTI). However, the PRACH position must be fixed once broadcasted and being aware to all UEs. Otherwise, the UE cannot start random access through the PRACH. In this regard, the frequency resource of PRACH cannot be next to the frequency resource of PUCCH1/1a/1b. In other word, the PRACH cannot be at the two edges of the PUSCH. Thus, to achieve the above aim, the PRACH can only be located into PUCCH area.

In addition, the proposed method also maintains the flexibility of PRACH position. In other words, the frequency position of the PRACH can be determined as in the existing standard, e.g., Reference 1.

According to the LTE standard, there are five types of PRACH format. Table 1 lists the parameter values for different formats.

TABLE 1

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4* | $448 \cdot T_s$ | $4096 \cdot T_s$ | wherein $T_s$ is the basic time unit.

For format 0~3, the frequency position of the PRACH can be determined by a configured parameter $n_{PRBoffset}^{RA}$ as blow:

$$n_{PRB}^{RA} = \begin{cases} n_{PRB\ offset}^{RA} + 6 \left\lfloor \frac{f_{RA}}{2} \right\rfloor, & \text{if } f_{RA} \bmod 2 = 0 \\ N_{RB}^{UL} - 6 - n_{PRB\ offset}^{RA} - 6 \left\lfloor \frac{f_{RA}}{2} \right\rfloor, & \text{otherwise} \end{cases} \quad (1)$$

wherein $n_{PRB}^{RA}$ denotes the first physical resource block (PRB) occupied by the PRACH resource; $n_{PRBoffset}^{RA}$ denotes the first PRB available for the PRACH; $N_{RB}^{UL}$ indicates the all PRB number of uplink frequency spectrum; and $f_{RA}$ denotes the PRACH resource frequency index within a considered time domain location, starting from 0.

The parameter $n_{PRBoffset}^{RA}$ indicates the PRACH starting PRB position from low frequency end of the operating bandwidth, which is decided by the network and can be broadcasted in System Information Block (SIB) message to user equipments. From the meaning of the parameter $n_{PRBoffset}^{RA}$, it can been obtained that $0 \leq n_{PRBoffset}^{RA} \leq N_{RB}^{UL} - 6$.

As long as the parameter $n_{PRBoffset}^{RA}$ is not set to exceed the whole PUCCH boundary into the PUSCH area, the frequency position of the PRACH can be guaranteed to be located in the PUCCH area and thus the PUSCH can be kept as a continuous PRB block. For example, if $n_{PRBoffset}^{RA}$ is set to ZERO, the PRACH is then located even outside of PUCCH 2 part until the lowest frequency end of the operating bandwidth. If $n_{PRBoffset}^{RA}$ is set to $N_{RB}^{UL} - 6$, the PRACH is then located at the highest frequency end of the operating bandwidth. Thus, almost the same flexibility of PRACH position can be maintained.

The parameter $f_{RA}$ may have different value depending on the type of frame structure. There are two types of frame structure. Frame structure type 1 is applicable to frequency division duplex (FDD), and frame structure type 2 is applicable to time division duplex (TDD). For frame structure type 1, $f_{RA} = 0$; for frame structure type 2, $f_{RA}$ is defined in a quadruple of the format $(f_{RA}, t_{RA}^0, t_{RA}^1, t_{RA}^2)$ according to table 5.7.1-4 in Reference 1 (3GPP TS 36.211 v8.6.03). The meanings and the values for $t_{RA}^0, t_{RA}^1, t_{RA}^2$ can be obtained from Reference 1, and thus the detailed description thereof is omitted here.

The preamble format 4 is used for frame structure type 2 (TDD) and special subframe configurations with Uplink Pilot Time Slot (UpPTS) lengths $4354 \cdot T_s$ and $5120 \cdot T_s$ only. There is no PUCCH resource allocation within the UpPTS for PRACH with format 4. Thus, the PRACH with format 4 will not influence the allocation of PUCCH.

Having determined the position of the PRACH, then at the step S420, a frequency position of the PUCCH is determined based on a PRACH-aware logic-to-physical mapping rule. "PRACH-aware" means the logic-to-physical mapping rule takes the frequency position of the PRACH as a parameter.

Because the frequency position of PRACH is decided by the parameter $n_{PRBoffset}^{RA}$, which allows for different PRACH positions among neighbouring cells to avoid interference on preamble during random access procedure, the proposed logic-to-physical mapping rule can guarantee the flexibility of PRACH configuration by being aware of the frequency position of the PRACH.

In some embodiments, the logic-to-physical mapping rule determines the frequency position of the PUCCH further based on a parity of the number of the PRACH in a current sub-frame, such that the obtained resource allocation can support both symmetric layout and asymmetric layout.

In some further embodiments, the logic space of the PUCCH and the logic space of the PRACH are independent of each other, which enables configuration of the PUCCH and configuration of the PRACH to be independent of each other.

Figures 5, 6:
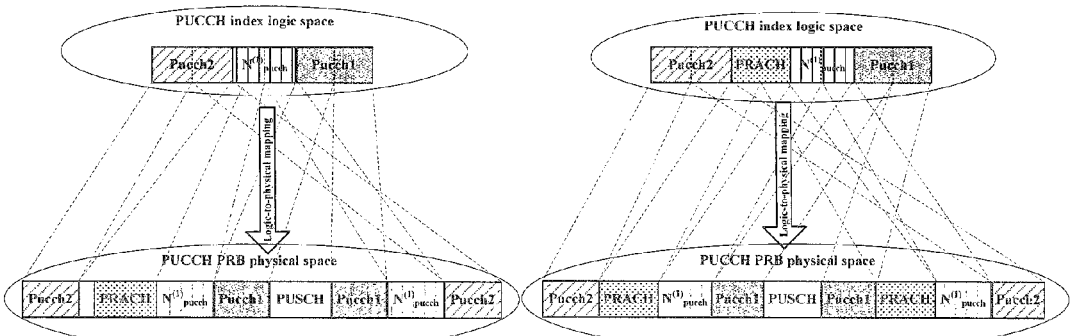
FIG. 5 schematically illustrates the logic-to-physical mapping of the PUCCH according to embodiments of the present invention.
FIG. 6 schematically illustrates the logic-to-physical mapping of the PUCCH according to the existing 3GPP standard.

FIG. 5 schematically illustrates the logic-to-physical mapping of PUCCH according to embodiments of the present invention.

As shown in FIG. 5, in the PUCCH index logic space, only PUCCH elements can be visible and construct continuous logic space due to the independency of PRACH logic space. However, when mapping the PUCCH from the logic space to the physical space, the mapping rule already considers the existence of the PRACH and automatically adjusts the PRB position of the PUCCH to guarantee no conflict occurrence and seamless incorporation. In this way, the PRACH can be inserted among the PUCCH physical resource (i.e., PRB) transparently and achieves the seamless adjacency and supports asymmetric layout. The detailed mapping rule for PUCCH will be described in the following.

According to the PRACH-aware logic-to-physical mapping rule, when an initial PRB position of the PUCCH without consideration of the PRACH is located at an inner side of the PRACH, the initial PRB position of the PUCCH is then shifted inward the PRB number of the PRACH (e.g., 6 PRBs). When the initial PRB position of the PUCCH is located at an outer side of the PRACH, the initial PRB position of the PUCCH can be kept unchanged. In this context, the inner side means the direction towards the middle of the frequency spectrum (i.e., the operating bandwidth), and the outer side means the direction away from the middle of the frequency spectrum. The above operation may be expressed as blow.

side of the PRACH. Under such conditions, the initial PRB position of the PUCCH can be kept unchanged. From the equation (3), it can be understood that $N_{PRBoffset}^{RAlow}$ indicates the PRACH starting PRB position at the low frequency end, which retrieves value from $n_{PRBoffset}^{RA}$ if it is closer to the low frequency end; otherwise from the peer part end $$N_{RB}^{UL} - n_{PRBoffset}^{RA} - \left\lfloor \frac{n_{PRACH}}{2} \right\rfloor * 6.$$

Briefly, $N_{PRBoffset}^{RAlow}$ is the lower boundary of the PRACH at the low frequency end. From the equation (4), it can be understood that $N_{PRBoffset}^{RAhigh}$ indicates the PRACH ending PRB position at the high frequency end, which retrieves value from $N_{RB}^{UL} - 1 - n_{PRBoffset}^{RA}$ if $n_{PRBoffset}^{RA}$ is closer to the low frequency end, otherwise from the peer part end $$n_{PRB} = \begin{cases} \left\lfloor \frac{m}{2} \right\rfloor & \text{if}(m+n_s \bmod 2)\bmod 2 = 0 \text{ and } \left\lfloor \frac{m}{2} \right\rfloor < N_{PRBoffset}^{RAlow} \\ \left\lfloor \frac{m}{2} \right\rfloor + N_{PRACH}^{low} & \text{if}(m+n_s \bmod 2)\bmod 2 = 0 \text{ and } \left\lfloor \frac{m}{2} \right\rfloor >= N_{PRBoffset}^{RAlow} \\ N_{RB}^{UL} - 1 - \left\lfloor \frac{m}{2} \right\rfloor - N_{PRACH}^{high} & \text{if}(m+n_s \bmod 2)\bmod 2 = 1 \text{ and } N_{RB}^{UL} - 1 - \left\lfloor \frac{m}{2} \right\rfloor <= N_{PRBoffset}^{RAhigh} \\ N_{RB}^{UL} - 1 - \left\lfloor \frac{m}{2} \right\rfloor & \text{if}(m+n_s \bmod 2)\bmod 2 = 1 \text{ and } N_{RB}^{UL} - 1 - \left\lfloor \frac{m}{2} \right\rfloor > N_{PRBoffset}^{RAhigh} \end{cases} \quad (2)$$

$$N_{PRBoffset}^{RAlow} = \min\left\{ n_{PRBoffset}^{RA}, \ N_{RB}^{UL} - n_{PRBoffset}^{RA} - \left\lfloor \frac{n_{PRACH}}{2} \right\rfloor * 6 \right\} \quad (3)$$

$$N_{PRBoffset}^{RAhigh} = \max\left\{ n_{PRBoffset}^{RA} + \left\lceil \frac{n_{PRACH}}{2} \right\rceil * 6 - 1, \ N_{RB}^{UL} - 1 - n_{PRBoffset}^{RA} \right\} \quad (4)$$

$$N_{PRACH}^{low} = \begin{cases} \left\lceil \frac{n_{PRACH}}{2} \right\rceil * 6 \text{ or} & n_{PRBoffset}^{RA} < N_{RB}^{UL} - n_{PRBoffset}^{RA} - \left\lfloor \frac{n_{PRACH}}{2} \right\rfloor * 6 \text{ and}(n_s \bmod 2) = 0 \\ & n_{PRBoffset}^{RA} + \left\lceil \frac{n_{PRACH}}{2} \right\rceil * 6 - 1 > N_{RB}^{UL} - 1 - n_{PRBoffset}^{RA} \text{ and}(n_s \bmod 2) = 1 \\ \left\lfloor \frac{n_{PRACH}}{2} \right\rfloor * 6 & \text{otherwise} \end{cases} \quad (5)$$

$$N_{PRACH}^{high} = \begin{cases} \left\lceil \frac{n_{PRACH}}{2} \right\rceil * 6 \text{ or} & n_{PRBoffset}^{RA} + \left\lceil \frac{n_{PRACH}}{2} \right\rceil * 6 - 1 > N_{RB}^{UL} - 1 - n_{PRBoffset}^{RA} \text{ and}(n_s \bmod 2) = 0 \\ & n_{PRBoffset}^{RA} < N_{RB}^{UL} - n_{PRBoffset}^{RA} - \left\lfloor \frac{n_{PRACH}}{2} \right\rfloor * 6 \text{ and}(n_s \bmod 2) = 1 \\ \left\lfloor \frac{n_{PRACH}}{2} \right\rfloor * 6 & \text{otherwise} \end{cases} \quad (6)$$

In the above equations, $n_{PRB}$ represents the PRB position to be used for transmission of the PUCCH in a slot $n_s$; the variable in indicates the initial PRB position of the PUCCH without consideration of the PRACH; $n_{PRBoffset}^{RA}$ represents the first PRB available for the PRACH; $N_{RB}^{UL}$ indicates the all PRB number of uplink frequency spectrum; and $n_{PRACH}$ denotes the number of the PRACH in a current sub-frame.

According to the PRACH-aware logic-to-physical mapping rule, the initial PRB position of the PUCCH (indicated by in) need to be further adjusted based on the real PRACH position. The conditions on the far right side of the equation (2) can be divided into two groups.

The conditions in the first row and the fourth row of the equation (2) constitute the first group, which means the initial PRB position of the PUCCH is located at the outer $$n_{PRBoffset}^{RA} + \left\lceil \frac{n_{PRACH}}{2} \right\rceil * 6 - 1.$$

Briefly, $N_{PRBoffset}^{RAhigh}$ is the upper boundary of the PRACH at the high frequency end.

The conditions in the second row and the third row of the equation (2) constitute the second group, which means the initial PRB position of the PUCCH is located at the inner side of the PRACH. Under such conditions, the initial PRB position of the PUCCH should be shifted inwards the PRB number of the PRACH (e.g., 6 PRBs), in order to reserve the physical space for the PRACH. Obviously, $N_{PRACH}^{low}$ in equation (5) is the PRB number of the PRACH at the low frequency end. For slot 0, it returns $$\left\lceil \frac{n_{PRACH}}{2} \right\rceil * 6$$

if $n_{PRBoffset}^{RA}$ is closer to the low frequency end, otherwise it returns $$\left\lfloor \frac{n_{PRACH}}{2} \right\rfloor * 6;$$

for slot 1, vice verse. $N_{PRACH}^{high}$ in equation (6) is the PRB number of the PRACH at the high frequency end. For slot 0, it returns $$\left\lfloor \frac{n_{PRACH}}{2} \right\rfloor * 6$$

if $n_{PRBoffset}^{RA}$ is closer to the low frequency end, otherwise it returns $$\left\lceil \frac{n_{PRACH}}{2} \right\rceil * 6;$$

for slot 1, vice verse.

Further, as seen from the above equations, the PRACH-aware logic-to-physical mapping rule not only takes the PUCCH itself index as an input, but also considers the PRACH position (indicated by $n_{PRBoffset}^{RA}$) and the PRACH number (i.e., $n_{PRACH}$) in a current sub-frame. For FDD, $n_{PRACH}$ can be calculated according to Table 5.7.1-2 in Reference 1; for TDD, it can be calculated according to Table 5.7.1-4 in Reference 1.

Just due to such awareness of PRACH existence, the proposed solution transparently maps the two independent logic spaces of PUCCH and PRACH into a same PRB spectrum without involvement of any special parameter configuration. Moreover, the proposed solution can guarantee no PRB confliction and seamless combination of PRACH with PUCCH, thus successfully achieving the aim of both the flexibility of PRACH configuration and the continuous PUSCH resource.

The calculation of the variable m is the same as Reference 1. Specifically, the variable in depends on the PUCCH format. For PUCCH formats 1, 1a and 1b, in may be determined as blow:

1/1a/1b; and $N_{sc}^{RB}$ denotes the resource block size in the frequency domain.

For PUCCH format 2, 2a and 2b, the variable in may be determined as blow:

$$m = \lfloor n_{PUCCH}^{(2)} / N_{sc}^{RB} \rfloor \quad (8)$$

wherein $n_{PUCCH}^{(2)}$ denotes the resource index for PUCCH formats 2/2a/2b.

For comparison, FIG. 6 schematically illustrates the logic-to-physical mapping of the PUCCH according to the existing 3GPP standard if incorporating the PRACH with the PUCCH seamlessly. Normally, the existing mapping rule adopts total separate strategies for PUCCH and PRACH. In this regard, the mapping rules for the PUCCH and the PRACH cannot see each other at all. Thus, to guarantee their seamless corporation, it must rely on very careful configuration of PUCCH and PRACH parameters, i.e., it must make sure no confliction from logic spaces.

As shown in FIG. 6, to insert the PRACH among the PUCCH PRB, the logic space of the PUCCH should reserve extra space for the PRACH, which actually makes the PRACH visible by the PUCCH logic space. In other words, when configuring the PUCCH in the PUCCH logic space, the PRACH is considered as a part of PUCCH, for example, as a part of $N_{pucch}^{(1)}$, wherein $N_{pucch}^{(1)}$ is the logic index offset of PUCCH1a/1b. In this way, when mapping the PUCCH from the logic space to the physical space, the mapping rule directly maps the PUCCH together with the PRACH to the physical space. As seen from the physical space shown in FIG. 6, such mapping solution can only support symmetric layout.

From the above comparison, it can be seen that, since existing PUCCH layout is separately defined from PRACH and its logic-to-physical mapping rule also doesn't consider the PRACH, if the PRACH need to be incorporated seamlessly with the PUCCH, it has to reserve enough space for the PRACH in the PUCCH logic space through carefully configuring parameter(s), which however has some disadvantages.

On one hand, it causes complicate PUCCH configuration. Since the PRACH need to be clearly seen in the PUCCH logic space, configuration of the PUCCH parameter(s) still need consider the PRACH. On the other hand, it can only support symmetric layout. The existing solution incorporates the PRACH into the PUCCH through expanding the PUCCH area, so the mapping rule actually treats the PRACH also as a part of the PUCCH. However, due to the PRACH cannot support frequency hopping like PUCCH, it $$m = \begin{cases} N_{RB}^{(2)} & \text{if } n_{PUCCH}^{(1)} < c \cdot N_{cs}^{(1)} / \Delta_{shift}^{PUCCH} \\ \left\lfloor \frac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases} \quad (7)$$

$$c = \begin{cases} 3 & \text{normal cyclic prefix} \\ 2 & \text{extended cyclic prefix} \end{cases}$$

wherein $N_{cs}^{(1)}$ denotes the number of cyclic shift used for PUCCH formats 1/1a/1b in a mixed resource block with PUCCH 2/2a/2b; $\Delta_{shift}^{PUCCH}$ is provided by higher layers to indicate the number of Zadoff-Chu (ZC) sequences among total 12 ones used for PUCCH1/1a/1b; $N_{RB}^{(2)}$ indicates the bandwidth available for us by PUCCH formats 2/2a/2b; $n_{PUCCH}^{(1)}$ denotes the resource index for PUCCH formats must reserve EVEN number of PRACH space in logic view even if it only need ODD one, otherwise the second slot of PUCCH will conflict with the PRACH.

On the contrary, according to proposed solution, although the logic space of PUCCH is still independent from that of PRACH, the proposed logic-to-physical mapping rule already considers the PRACH, which makes the PRACH transparently inserted during logic-to-physical mapping and then incorporated seamlessly with the PUCCH PRB. Particularly, embodiments of the proposed solution have at least following two advantages.

First, it simplifies the PUCCH parameter configuration. Due that the PRACH is invisible in the PUCCH logic space, there is no need to consider the PRACH at all when configuring the PUCCH.

Second, it supports both symmetric PRACH layout and asymmetric PRACH layout. Because the proposed mapping rule itself already takes care about the PRACH specifically instead of same treatment as the PUCCH, the PRACH will be not impacted by the PUCCH frequency hopping, and thus the asymmetric layout for odd number PRACH can be supported.

Moreover, for TDD-LTE, the proposed solution still has extra more advantages than FDD.

Due to TDD specific bundling characteristics, i.e., multiple consecutive downlink sub-frames' HARQ feedback will be bundled together and replied at a same uplink sub-frame in which each downlink sub-frame has its individual HARQ PRB, the whole PUCCH index logic space in TDD mode is expanded compared with FDD mode which just has one-to-one relationship between downlink and uplink sub-frame. In other word, the room for PRACH free move is also enlarged and the flexibility of PRACH will be also increased accordingly at the premise of keeping continuous PUSCH resource block.

As mentioned above, the proposed solution may be performed on the network side or the user side. There is a backward compatibility issue when the legacy UE cannot recognize the new solution. In some embodiment, for the legacy UEs, they can be handled through enhanced-Node B (eNB) scheduling. That is, the eNB does not schedule the legacy UEs at specific downlink sub-frame whose corresponding HARQ feedback will be impacted by a subsequent PRACH.

Figure 7:
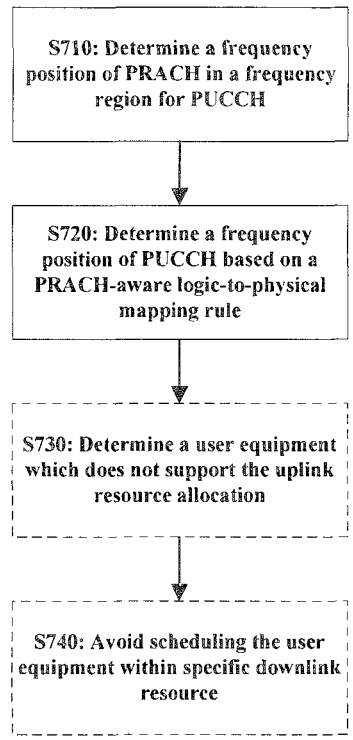
FIG. 7 illustrates an exemplary process flow of the method in a base station for uplink resource allocation according to embodiments of the present invention.

FIG. 7 illustrates an exemplary process flow of the method in a base station for uplink resource allocation according to embodiments of the present.

As shown in FIG. 7, the method begins at the step S710, and proceeds to the step S720. The steps S710 and S720 are the same as the steps S410 and S420 in FIG. 4. Thus the detailed description thereof is omitted here.

At the step S730, the base station can determine a user equipment which does not support the proposed solution for uplink resource allocation. The determination of the UE capability may be performed via any known technique, and the present invention has no limit in this point.

Then, at the step S740, once finding a legacy UE, the base station can schedule the determined UE at a resource rather than a specific downlink sub-frame. Corresponding HARQ feedback of the specific downlink sub-frame will be impacted by a subsequent PRACH.

Specifically, the specific downlink sub-frame can be identified based on both of two conditions: a HARQ feedback of the specific downlink sub-frame will appear at the same uplink sub-frame as the subsequent PRACH; and the HARQ feedback of the specific downlink sub-frame will be located at a HARQ PRB at an inner side of the subsequent PRACH.

By not scheduling at this specific downlink sub-frame, the corresponding PUCCH 1a/1b (i.e., HARQ feedback) will not conflict with the PRACH. In this way, those legacy UEs can still work under the proposed solution. Further, since the PRACH only appears in a few sub-frames and the legacy UEs with above two conditions are only a minor part among all UEs, such special handing won't have negative impact to the whole system.

Figure 8:
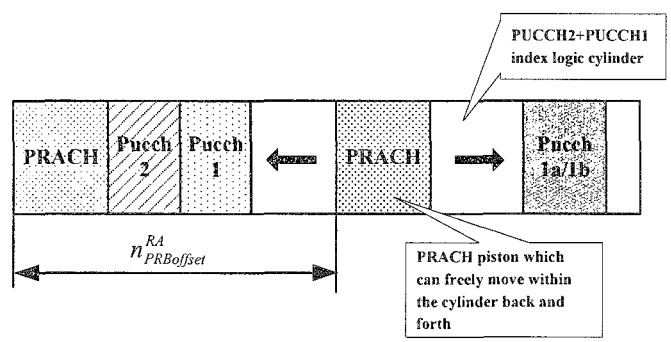
FIG. 8 schematically illustrates the implementation of the uplink resource allocation according to embodiments of the present invention.

The above thus has described the proposed method for uplink resource allocation. For the purpose of visualization and intuition, FIG. 8 schematically illustrates the implementation of the uplink resource allocation according to embodiments of the present invention.

Briefly, the proposed solution can be analogy to a car engine. As shown in FIG. 8, the whole PUCCH physic space (PRB resource blocks) constructs the engine cylinder. The PRACH resource is like the piston which can freely move back and forth according to the parameter $n_{PRBoffset}^{RA}$ within the PUCCH cylinder. The PRACH can even move outside of PUCCH2 to one end of the operating bandwidth. Moreover, the PRACH is not required to be settled down at PUCCH2 or PUCCH1 boundary, instead it can move to any PRB within PUCCH area. Whenever PRACH moves to a new PRB position, the PUCCH resource at the new PRB is just like the extruded gas flowing in reverse direction to fill up the original PRACH PRB. So in any case, the PRACH can be incorporated seamlessly with PUCCH, then always leaving PUSCH as a continuous resource block.

FIG. 9 is a schematic block diagram of an apparatus 900 that may be configured to practice exemplary embodiments according to the present invention. The apparatus 900 may be a base station or a user equipment.

As shown in FIG. 9, the apparatus 900 may comprise a first determination unit 910 and a second determination unit 920. The first determination unit 910 may be configured to determine a frequency position of PRACH in a frequency region for PUCCH. The second determination unit 920 may be configured to determine a frequency position of the PUCCH based on a logic-to-physical mapping rule, wherein the logic-to-physical mapping rule takes the frequency position of the PRACH as a parameter.

In some embodiments, a logic space of the PUCCH and a logic space of the PRACH are independent of each other, which enables configuration of the PUCCH and configuration of the PRACH to be independent of each other.

In some embodiments, the logic-to-physical mapping rule determines the frequency position of the PUCCH further based on a parity of the number of the PRACH in a current sub-frame, such that the obtained resource allocation can support both symmetric layout and asymmetric layout.

The first determination unit 910 may be configured to determine the frequency position of PRACH according to the above equation (1). The second determination unit 920 may be configured to determine the frequency position of PUCCH according to the PRACH-aware logic-to-physical mapping rule as expressed in equations (2)-(6). Reference can be made to the previous description with respect to FIGS. 4-5.

It should be understood, the units 910 and 920 contained in the apparatus 900 are configured for practicing exemplary embodiments of the present invention. Thus, the operations and features described above with respect to FIGS. 4-5 also apply to the apparatus 900 and the units therein, and the detailed description thereof is omitted here.

As mentioned above, there is a backward compatibility issue when the legacy UE cannot recognize the new solution. In some embodiment, for the legacy UEs, they can be handled through enhanced-Node B (eNB) scheduling. FIG. 10 is a schematic block diagram of an apparatus 1000 (e.g., eNB) that may be configured to practice exemplary embodiments according to some further embodiments of the present invention.

As shown in FIG. 10, the apparatus 1000 may comprise a first determination unit 1010, a second determination unit 1020, a third determination unit 1030, and a scheduling unit 1040. The functions of the units 1010 and 1020 are the same as the units 910 and 920 in FIG. 9, and thus the detailed description thereof is omitted here.

The third determination unit 1030 may be configured to determine a user equipment which does not support the proposed solution for uplink resource allocation. The determination of the UE capability may be performed via any known technique, and the present invention has no limit in this point.

The scheduling unit 1040 may be configured to schedule the determined UE at a resource rather than a specific downlink sub-frame. Corresponding HARQ feedback of the specific downlink sub-frame will be impacted by a subsequent PRACH.

Specifically, the specific downlink sub-frame can be identified based on both of two conditions: a HARQ feedback of the specific downlink sub-frame will appear at the same uplink sub-frame as the subsequent PRACH; and the HARQ feedback of the specific downlink sub-frame will be located at a HARQ PRB at an inner side of the subsequent PRACH.

It should be understood, the units 1010-1040 contained in the apparatus 1000 are configured for practicing exemplary embodiments of the present invention. Thus, the operations and features described above with respect to FIGS. 4-5 and 7 also apply to the apparatus 1000 and the units therein, and the detailed description thereof is omitted here.

FIG. 11 illustrates a simplified block diagram of an entity 1100 that is suitable for use in practicing exemplary embodiments of the present invention. The entity 1100 may be an entity at the network side, for example, a base station, or an entity at the user side, e.g., a user equipment.

As shown in FIG. 11, the entity 1100 includes a data processor (DP) 1101, a memory (MEM) 1102 coupled to the DP 1101, and a suitable RF transmitter TX and receiver RX 1104 coupled to the DP 1101. The MEM 1102 stores a program (PROG) 1103. The TX/RX 1104 is for bidirectional wireless communications. Note that the TX/RX 1104 has at least one antenna to facilitate communication, though in practice a BS or a UE may have several. The entity 1100 may be coupled via a data path to one or more external networks or systems, such as the internet, for example.

The PROG 1103 is assumed to include program instructions that, when executed by the associated DP 1101, enable the entity 1100 to operate in accordance with the exemplary embodiments of this invention, as discussed herein with the methods in FIGS. 4 and 7. For example, the PROG 1103 and the DP 1101 may embody the first determination unit 910/1010, the second determination unit 920/1020, the third determination unit 1030, and the scheduling unit 1040 to perform the respective functions.

The embodiments of the present invention may be implemented by computer software executable by the DP 1101 of the entity 1100, or by hardware, or by a combination of software and hardware.

The MEM 1102 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the entity 1100, there may be several physically distinct memory units in the entity 1100. The DP 1101 may be of any type suitable to the local technical environment, and may include one or more of general purpose computers, special purpose computers, microprocessors, digital signal processors (DSPs) and processors based on multicore processor architecture, as non limiting examples. The entity 1100 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for uplink resource allocation, comprising:
   receiving, by the UE, a logic-to-physical mapping rule from a network node;

determining, by the UE, a frequency position of physical random access channel (PRACH) in a frequency region for physical uplink control channel (PUCCH); and determining, by the UE, a frequency position of the PUCCH based on the logic-to-physical mapping rule, wherein the logic-to-physical mapping rule takes the frequency position of the PRACH as a parameter, and wherein the frequency position of the PRACH may be freely moved within the PUCCH, and wherein a logic space of the PRACH and a logic space of the PUCCH comprise two independent logic spaces within a physical resource block spectrum, the two independent logic spaces causing no physical resource block conflict.

2. The method of claim 1, wherein the logic-to-physical mapping rule determines the frequency position of the PUCCH further based on a parity of the number of the PRACH in a current sub-frame.

3. The method of claim 1, wherein according to the logic-to-physical mapping rule, when an initial physical resource block (PRB) position of the PUCCH without consideration of the PRACH is located at an inner side of the PRACH, the initial PRB position of the PUCCH is shifted inward the PRB number of the PRACH, and said inner side means the direction towards the middle of an operating bandwidth.

4. The method of claim 3, wherein the frequency position of the PUCCH is determined as below:

$$n_{PRB} = \begin{cases} \left\lfloor \frac{m}{2} \right\rfloor & \text{if}(m + n_s \bmod 2) \bmod 2 = 0 \text{ and } \left\lfloor \frac{m}{2} \right\rfloor < N_{PRBoffset}^{RAlow} \\ \left\lfloor \frac{m}{2} \right\rfloor + N_{PRACH}^{low} & \text{if}(m + n_s \bmod 2) \bmod 2 = 0 \text{ and } \left\lfloor \frac{m}{2} \right\rfloor >= N_{PRBoffset}^{RAlow} \\ N_{RB}^{UL} - 1 - \left\lfloor \frac{m}{2} \right\rfloor - N_{PRACH}^{high} & \text{if}(m + n_s \bmod 2) \bmod 2 = 1 \text{ and } N_{RB}^{UL} - 1 - \left\lfloor \frac{m}{2} \right\rfloor <= N_{PRBoffset}^{RAhigh} \\ N_{RB}^{UL} - 1 - \left\lfloor \frac{m}{2} \right\rfloor & \text{if}(m + n_s \bmod 2) \bmod 2 = 1 \text{ and } N_{RB}^{UL} - 1 - \left\lfloor \frac{m}{2} \right\rfloor > N_{PRBoffset}^{RAhigh} \end{cases}$$

$$N_{PRBoffset}^{RAhigh} = \min\left\{ n_{PRBoffset}^{RA}, \ N_{RB}^{UL} - n_{PRBoffset}^{RA} - \left\lfloor \frac{n_{PRACH}}{2} \right\rfloor * 6 \right\}$$

$$N_{PRBoffset}^{RAhigh} = \max\left\{ n_{PRBoffset}^{RA} + \left\lceil \frac{n_{PRACH}}{2} \right\rceil * 6 - 1, \ N_{RB}^{UL} - 1 - n_{PRBoffset}^{RA} \right\}$$

$$N_{PRACH}^{low} = \begin{cases} \left\lceil \frac{n_{PRACH}}{2} \right\rceil * 6 \text{ or } & n_{PRBoffset}^{RA} < N_{RB}^{UL} - n_{PRBoffset}^{RA} - \left\lfloor \frac{n_{PRACH}}{2} \right\rfloor * 6 \text{ and}(n_s \bmod 2) = 0 \\ & n_{PRBoffset}^{RA} + \left\lceil \frac{n_{PRACH}}{2} \right\rceil * 6 - 1 > N_{RB}^{UL} - 1 - n_{PRBoffset}^{RA} \text{ and}(n_s \bmod 2) = 1 \\ \left\lfloor \frac{n_{PRACH}}{2} \right\rfloor * 6 & \text{otherwise} \end{cases}$$

$$N_{PRACH}^{high} = \begin{cases} \left\lceil \frac{n_{PRACH}}{2} \right\rceil * 6 \text{ or } & n_{PRBoffset}^{RA} + \left\lceil \frac{n_{PRACH}}{2} \right\rceil * 6 - 1 > N_{RB}^{UL} - 1 - n_{PRBoffset}^{RA} \text{ and}(n_s \bmod 2) = 0 \\ & n_{PRBoffset}^{RA} < N_{RB}^{UL} - n_{PRBoffset}^{RA} - \left\lfloor \frac{n_{PRACH}}{2} \right\rfloor * 6 \text{ and}(n_s \bmod 2) = 1 \\ \left\lfloor \frac{n_{PRACH}}{2} \right\rfloor * 6 & \text{otherwise} \end{cases}$$

wherein $n_{PRB}$ represents the PRB position to be used for transmission of the PUCCH in a slot $n_s$; the variable m indicates the initial PRB position of the PUCCH without consideration of the PRACH; $n_{PRBoffset}^{RA}$, represents the first PRB available for the PRACH; $N_{RB}^{UL}$ indicates the all PRB number of uplink frequency spectrum; and $n_{PRACH}$ denotes the number of the PRACH in a current sub-frame.

5. The method of claim 4, wherein the variable m varies according to different PUCCH formats.

6. The method of claim 5, wherein:
for PUCCH format 1, 1a, and 1b, the variable m is determined as:

$$m = \begin{cases} N_{RB}^{(2)} & \text{if } n_{PUCCH}^{(1)} < c \cdot N_{cs}^{(1)} / \Delta_{shift}^{PUCCH} \\ \left\lfloor \frac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

Wherein $N_{cs}^{(1)}$ denotes the number of cyclic shift used for PUCCH formats 1/1a/1b in a mixed resource block with PUCCH 2/2a/2b; $\Delta_{shift}^{PUCCH}$ indicates the number of Zadoff-Chu (ZC) sequences used for PUCCH1/1a/1b; $N_{RB}^{(2)}$ indicates the bandwidth available for use by PUCCH formats 2/2a/2b; $n_{PUCCH}^{(1)}$ denotes the resource index for PUCCH formats 1/1a/1b; and $N_{sc}^{RB}$ denotes the resource block size in the frequency domain; and for formats 2, 2a, and 2b, the variable m is determined as:

$$m = \lfloor n_{PUCCH}^{(2)}/N_{sc}^{RB} \rfloor$$

Wherein $n_{PUCCH}^{(2)}$ denotes the resource index for PUCCH formats 2/2a/2b.

7. The method of claim 1,
wherein the frequency position of the PRACH is determined as:

$$n_{PRB}^{RA} = \begin{cases} n_{PRB\ offset}^{RA} + 6 \lfloor \frac{f_{RA}}{2} \rfloor, & \text{if } f_{RA} \bmod 2 = 0 \\ N_{RB}^{UL} - 6 - n_{PRB\ offset}^{RA} - 6 \lfloor \frac{f_{RA}}{2} \rfloor, & \text{otherwise} \end{cases}$$

wherein $n_{PRB}^{RA}$ denotes the first physical resource block (PRB) occupied by the PRACH resource; $n_{PRBoffset}^{RA}$ denotes the first PRB available for the PRACH; $n_{RB}^{UL}$ indicates the all PRB number of uplink frequency spectrum; and $f_{RA}$ denotes the PRACH resource frequency index within a considered time domain location.

8. The method of claim 1, further comprising:
determining a user equipment which does not support said determining of the frequency position of the PUCCH; and
scheduling the user equipment at a resource rather than a specific downlink sub-frame, wherein corresponding hybrid automatic retransmission request (HARQ) feedback of the specific downlink sub-frame will be impacted by a subsequent PRACH.

9. The method of claim 8, wherein the specific downlink sub-frame can be identified based on both of the following conditions:
a HARQ feedback of the specific downlink sub-frame will appear at the same uplink sub-frame as said subsequent PRACH; and
the HARQ feedback of the specific downlink sub-frame will be located at a HARQ PRB at an inner side of said subsequent PRACH.

10. An user equipment (UE) for uplink resource allocation, the UE comprising a transmitter, a processor, and a memory, the UE configured to:
receive a logic-to-physical mapping rule from a network node;
determine a frequency position of physical random access channel (PRACH) in a frequency region for physical uplink control channel (PUCCH); and
determine a frequency position of the PUCCH based on a logic-to-physical mapping rule, wherein the logic-to-physical mapping rule takes the frequency position for the PRACH as a parameter, and
wherein the frequency position of the PRACH may be freely moved within the PUCCH, and wherein a logic space of the PRACH and a logic space of the PUCCH comprise two independent logic spaces within a physical resource block spectrum, the two independent logic spaces causing no physical resource block conflict.

11. The apparatus of claim 10, wherein the logic-to-physical mapping rule determines the frequency position of the PUCCH further based on a parity of the number of the PRACH in a current sub-frame.

12. The apparatus of claim 10, wherein according to the logic-to-physical mapping rule, when an initial physical resource block (PRB) position of the PUCCH without consideration of the PRACH is located at an inner side of the PRACH, the initial PRB position of the PUCCH is shifted inward the PRB number of the PRACH, and said inner side means the direction towards the middle of an operating bandwidth.

13. The apparatus of claim 12, wherein the second determination unit is configured to determine the frequency position of the PUCCH as below:

$$n_{PRB} = \begin{cases} \lfloor \frac{m}{2} \rfloor & \text{if}(m + n_s \bmod 2) \bmod 2 = 0 \text{ and } \lfloor \frac{m}{2} \rfloor < N_{PRBoffset}^{RAlow} \\ \lfloor \frac{m}{2} \rfloor + N_{PRACH}^{low} & \text{if}(m + n_s \bmod 2) \bmod 2 = 0 \text{ and } \lfloor \frac{m}{2} \rfloor >= N_{PRBoffset}^{RAlow} \\ N_{RB}^{UL} - 1 - \lfloor \frac{m}{2} \rfloor - N_{PRACH}^{high} & \text{if}(m + n_s \bmod 2) \bmod 2 = 1 \text{ and } N_{RB}^{UL} - 1 - \lfloor \frac{m}{2} \rfloor <= N_{PRBoffset}^{RAhigh} \\ N_{RB}^{UL} - 1 - \lfloor \frac{m}{2} \rfloor & \text{if}(m + n_s \bmod 2) \bmod 2 = 1 \text{ and } N_{RB}^{UL} - 1 - \lfloor \frac{m}{2} \rfloor > N_{PRBoffset}^{RAhigh} \end{cases}$$

$$N_{PRBoffset}^{RAhigh} = \min\left\{ n_{PRBoffset}^{RA}, N_{RB}^{UL} - n_{PRBoffset}^{RA} - \lfloor \frac{n_{PRACH}}{2} \rfloor * 6 \right\}$$

$$N_{PRBoffset}^{RAhigh} = \max\left\{ n_{PRBoffset}^{RA} + \lceil \frac{n_{PRACH}}{2} \rceil * 6 - 1, \ N_{RB}^{UL} - 1 - n_{PRBoffset}^{RA} \right\}$$

$$N_{PRACH}^{low} = \begin{cases} \lceil \frac{n_{PRACH}}{2} \rceil * 6 & n_{PRBoffset}^{RA} < N_{RB}^{UL} - n_{PRBoffset}^{RA} - \lfloor \frac{n_{PRACH}}{2} \rfloor * 6 \text{ and}(n_s \bmod 2) = 0 \\ & \text{or} \\ & n_{PRBoffset}^{RA} + \lceil \frac{n_{PRACH}}{2} \rceil * 6 - 1 > N_{RB}^{UL} - 1 - n_{PRBoffset}^{RA} \text{ and}(n_s \bmod 2) = 1 \\ \lfloor \frac{n_{PRACH}}{2} \rfloor * 6 & \text{otherwise} \end{cases}$$

-continued $$N_{PRACH}^{high} = \begin{cases} n_{PRBoffset}^{RA} + \lceil \frac{n_{PRACH}}{2} \rceil * 6 - 1 > N_{RB}^{UL} - 1 - n_{PRBoffset}^{RA} \text{ and}(n_s \bmod 2) = 0 \\ \lceil \frac{n_{PRACH}}{2} \rceil * 6 \text{ or} \\ n_{PRBoffset}^{RA} < N_{RB}^{UL} - n_{PRBoffset}^{RA} - \lfloor \frac{n_{PRACH}}{2} \rfloor * 6 \text{ and}(n_s \bmod 2) = 1 \\ \lfloor \frac{n_{PRACH}}{2} \rfloor * 6 \text{ otherwise} \end{cases}$$

wherein $n_{PRB}$ represents the PRB position to be used for transmission of the PUCCH in a slot $n_s$; the variable m indicates the initial PRB position of the PUCCH without consideration of the PRACH; $n_{PRBoffset}^{RA}$ of the first PRB available for the PRACH; $N_{RB}^{UL}$ indicates the all PRB number of uplink frequency spectrum; and $n_{PRACH}$ denotes the number of the PRACH in a current sub-frame.

14. The apparatus of claim 13, wherein the variable m varies according to different PUCCH formats.

15. The apparatus of claim 14, wherein:
for PUCCH format 1, 1a, and 1b, the variable m is determined as:

$$m = \begin{cases} N_{RB}^{(2)} & \text{if } n_{PUCCH}^{(1)} < c \cdot N_{cs}^{(1)} / \Delta_{shift}^{PUCCH} \\ \lfloor \frac{n_{PUCCH}^{(1)} - c \cdot N_{cs}^{(1)} / \Delta_{shift}^{PUCCH}}{c \cdot N_{sc}^{RB} / \Delta_{shift}^{PUCCH}} \rfloor + N_{RB}^{(2)} + \lceil \frac{N_{cs}^{(1)}}{8} \rceil & \text{otherwise} \end{cases}$$

$$c = \begin{cases} 3 & \text{normal cyclic prefix} \\ 2 & \text{extended cyclic prefix} \end{cases}$$

wherein $N_{cs}^{(1)}$ denotes the number of cyclic shift used for PUCCH formats 1/1a/1b in a mixed resource block with PUCCH 2/2a/2b; $\Delta_{shift}^{PUCCH}$ indicates the number of ZC sequences used for PUCCH1/1a/1b; $N_{RB}^{(2)}$ indicates the bandwidth available for use by PUCCH formats 2/2a/2b; $n_{PUCCH}^{(1)}$ denotes the resource index for PUCCH formats 1/1a/1b; and $N_{sc}^{RB}$ denotes the resource block size in the frequency domain; and for formats 2, 2a, and 2b, the variable m is determined as:

$$m = \lfloor n_{PUCCH}^{(2)} / N_{sc}^{RB} \rfloor$$

Wherein $n_{PUCCH}^{(2)}$ denotes the resource index for PUCCH formats 2/2a/2b.

16. The apparatus of claim 10, wherein the first determination unit is configured to determine the frequency position of the PRACH as below:

$$n_{PRB}^{RA} = \begin{cases} n_{PRB \text{ offset}}^{RA} + 6 \lfloor \frac{f_{RA}}{2} \rfloor, & \text{if } f_{RA} \bmod 2 = 0 \\ N_{RB}^{UL} - 6 - n_{PRB \text{ offset}}^{RA} - 6 \lfloor \frac{f_{RA}}{2} \rfloor, & \text{otherwise} \end{cases}$$

Wherein $n_{PRB}^{RA}$ denotes the first physical resource block (PRB) occupied by the PRACH resource; $n_{PRBoffset}^{RA}$ denotes the first PRB available for the PRACH; $N_{RB}^{UL}$ indicates the all PRB number of uplink frequency spectrum; and $f_{RA}$ denotes the PRACH resource frequency index within a considered time domain location.

17. A non-transitory computer-readable storage media having computer program code stored thereon, the computer program code configured to, when executed, cause a processor to:
receive a logic-to-physical mapping rule from a network node;
determine a frequency position of physical random access channel (PRACH) in a frequency region for physical uplink control channel (PUCCH); and
determine a frequency position of the PUCCH based on the logic-to-physical mapping rule, wherein the logic-to-physical mapping rule takes the frequency position of the PRACH as a parameter, and
wherein the frequency position of the PRACH may be freely moved within the PUCCH, and wherein a logic space of the PRACH and a logic space of the PUCCH comprise two independent logic spaces within a physical resource block spectrum, the two independent logic spaces causing no physical resource block conflict.

* * * * *